Nov. 3, 1931.  V. G. VAUGHAN  1,830,578
TEMPERATURE CONTROL SYSTEM
Filed Dec. 14, 1928

INVENTOR
Victor G. Vaughan.
BY
ATTORNEY

Patented Nov. 3, 1931

1,830,578

UNITED STATES PATENT OFFICE

VICTOR G. VAUGHAN, OF MANSFIELD, OHIO, ASSIGNOR TO WESTINGHOUSE ELECTRIC & MANUFACTURING COMPANY, A CORPORATION OF PENNSYLVANIA

TEMPERATURE CONTROL SYSTEM

Application filed December 14, 1928. Serial No. 326,026.

My invention relates to electric control systems and more particularly to thermal relays included in such systems.

An object of my invention is to provide a relatively simple and effective thermal relay and control system for an electric energy translating device, that shall be effective to interrupt the circuit upon occurrence of a predetermined overload in the energy translating device and that shall maintain the circuit in the interrupted condition until manually restored.

In practicing my invention, I provide in combination with an energy translating device, a manually actuable switch therefor, a thermal relay operative to interrupt the circuit through the energy translating device, and electric heating means operatively associated with the thermal relay and controlled directly thereby for maintaining the thermal relay in its open circuit position as long as the manually operable control switch remains closed.

Figure 1:
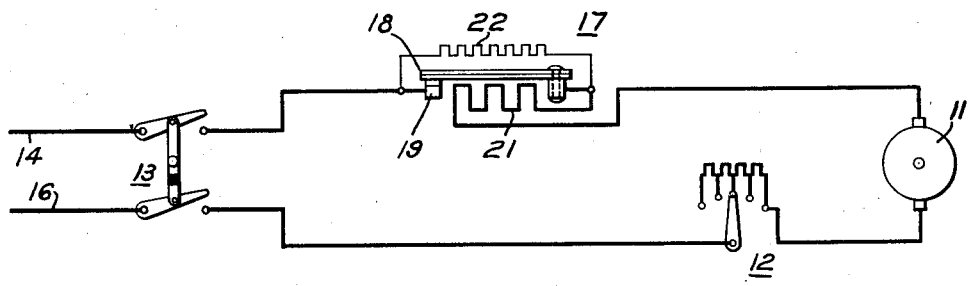
Figure 2:
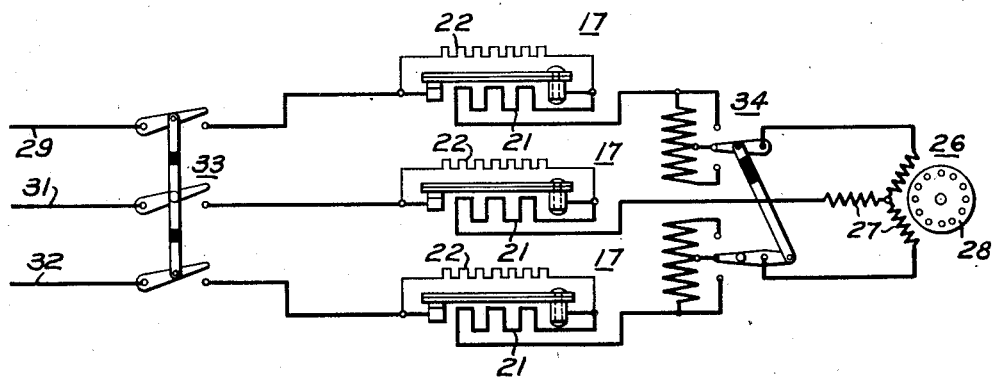

In the single sheet of drawings:

Figure 1 is a diagram of connections illustrating schematically the circuit and device embodying my invention, and Fig. 2 is a modified form of circuit illustrating my invention.

Referring more particularly to Fig. 1 of the drawings, I have there illustrated an energy translating device 11 shown schematically as a direct-current motor and connected in series electric circuit with a suitable starting means 12 here shown as a manually operated starting box of any suitable or desired kind. A manually operable switch 13 is also provided for initially controlling the energization of the device 11 and a source of supply comprises conductors 14 and 16 connected in the usual manner.

While I have illustrated a direct-current motor and a specific form of starting box and switch, these are for illustrative purposes only and the energy-translating device 11 may be of any kind, such as a direct-current motor, an alternating-current motor, a transformer or any similar device which may be subjected to overloads.

A thermal relay 17 is shown as being connected in series electric circuit with the energy-translating device 11 and comprises a bimetallic strip 18 having one end fixed and the other end free to move to engage or to be disengaged from a fixed contact terminal 19.

A heating element 21 of relatively large current carrying capacity and of relatively low ohmic resistance is connected in series circuit with the current-traversed bimetallic strip 18 and the energy-translating device 11.

An auxiliary heating element 22 of relatively high ohmic resistance and of small current carrying capacity is connected to the fixed contact terminal of the bimetallic strip 18 and to the other contact terminal 19 so that it is normally short circuited by the bimetallic strip 18 when the movable end thereof is in engagement with the terminal 19.

It is to be understood that the thermally-actuable circuit interrupting device hereinbefore described and shown in the drawings is for illustrative purposes only, and that any device effective for the same purpose may be used or that a contactor may be used for directly controlling the circuit of the device 11 and that the relay 17 is used to control the contactor itself.

Referring more particularly to Fig. 2 of the drawings, I have there illustrated an alternating current motor 26 embodying a polyphase energizing winding 27 and a rotor 28. As a three-phase energy-translating device is shown, a three-phase source of supply is provided embodying conductors 29, 31 and 32 and a triple-pole manually operable switch 33 controls the circuit through the motor winding 27.

A starting device 34 is provided, here shown as embodying two starting resistors and a double-arm controller manually operable to cut out of circuit the starting resistances. It is to be understood that the starter 34 is illustrated schematically only and that any device effective for the same purpose may be used.

A plurality of thermal relays 17 are provided which are constituted, as hereinbefore described in connection with Fig. 1 of the drawings, it being understood, of course, that in each case the series resistor 21 and the shunt resistor 22 are respectively designed for the normal current and the overload current values at which they are to be operated in connection with the constants of the respective energy-translating devices and the voltages of the supply circuits.

If it be assumed that the energy-translating device 11 be subjected to a predetermined overload for a predetermined length of time, which, under normal conditions, would cause the temperature thereof to rise above a predetermined safe maximum value, the design of the thermal relay, and more particularly of the heating element 21, is such that the circuit through the energy-translating device 11 is interrupted. As soon as this occurs, which action in the relay shown in Fig. 1 of the drawings will be effected by movement of the free end of the bimetallic strip 18, it is obvious that the normally inoperative shunt-connected resistor 22 will be connected in series electric circuit relation relatively to the device 11. The element 22 is thereby energized to a predetermined degree and is effective to maintain the bimetallic strip 18 in its open position so that the circuit through the device 11 will remain interrupted, as far as normal operation of the device 11 is concerned, until an operator actuates the switch 13 to its open position whereby the element 22 is permitted to cool and the strip 18 will return to its initial closed position.

The thermal relay and the control circuit hereinbefore described and embodying my invention thus provide what may be called a thermally-actuable lock-out means for maintaining a circuit in its interrupted condition and the element 22 may be considered also as a thermal latching means for insuring that the thermally-actuable element 18 remains in its open position when once it has been actuated thereto.

Fig. 2 illustrates the application of one or more of the devices and circuits illustrated in Fig. 1 to a polyphase energy-translating device and system.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In an electric circuit comprising an energy translating device and a main switch, in combination, a thermally-actuable switch connected in series relation to the main switch and actuated to control the energization of the energy-translating device upon the occurrence of a predetermined overload therein, and a heating element operatively associated with the thermally actuable switch and placed in series circuit relation to the energy-translating device upon actuation of the thermally-actuable switch for causing the latter to remain in its actuated position.

2. In an electric circuit comprising an energy translating device and a main switch therefor, in combination, a thermally-actuable switch for controlling the energization of the energy translating device, and electric means operatively associated with the thermally-actuable switch and directly controlled thereby for causing it to remain in its open position.

3. In an electric circuit comprising an energy translating device and a main switch therefor, in combination, a thermally-actuable switch for controlling the energization of the energy translating device, and means embodying a heating element of relatively high resistance operatively associated with the thermally-actuable switch and directly controlled thereby for causing it to remain in its open position.

4. In an electric circuit, the combination with an energy translating device and a manually operable main switch therefor, of means for effecting substantial deenergization of the energy translating device and for maintaining it substantially deenergized until the main switch is opened, said means comprising a thermally-actuable switch, a series-connected heating element of relatively low resistance for energizing the thermally-actuable switch to its open position upon occurrence of a predetermined overload on the energy translating device, and a second heating element of relatively high resistance connected in series with the energy translating device upon opening of the thermally-actuable switch.

5. In an electric circuit, the combination with an energy translating device and a manually operable main switch therefor, of means for effecting substantial deenergization of the energy translating device and for maintaining it substantially deenergized until the main switch is opened, said means comprising a thermally-actuable switch, a normally operative series heating element and a normally inoperative shunt heating element of relatively high resistance, directly operatively associated with the thermally-actuable switch.

6. In an electrc circuit, the combination with an energy translating device and manually operable main switch therefor, of means for effecting substantial deenergization of the energy translating device and for maintaining it substantially deenergized until the main switch is opened, said means comprising a thermally-actuable switch, a series-connected heating element of relatively low resistance for energizing the thermally-actuable switch to its open poistion upon occurrence of a predetermined overload on the energy translating device, and a second heating element of relatively high resistance connected in shunt circuit relation to the thermally-actuable switch.

In testimony whereof, I have hereunto subscribed my name this 1 day of December, 1928.

VICTOR G. VAUGHAN.